July 12, 1966 E. G. B. JACOBSSON 3,260,851

APPARATUS FOR VISUAL INVESTIGATION OF OBJECTS BY MEANS OF PHOTOCELL

Filed Jan. 14, 1963

INVENTOR.
EINAR G. B. JACOBSSON
BY
Frank R. Trifari
AGENT 3,260,851
Patented July 12, 1966

3,260,851

APPARATUS FOR VISUAL INVESTIGATION OF OBJECTS BY MEANS OF PHOTOCELL

Einar Gosta Birger Jacobsson, Bandhagen, Sweden, assignor to North American Philips Company, Inc., New York, N.Y., a corporation of Delaware Filed Jan. 14, 1963, Ser. No. 251,236
Claims priority, application Sweden, Jan. 31, 1962, 1,089/62
11 Claims. (Cl. 250—223)

Figure 1:
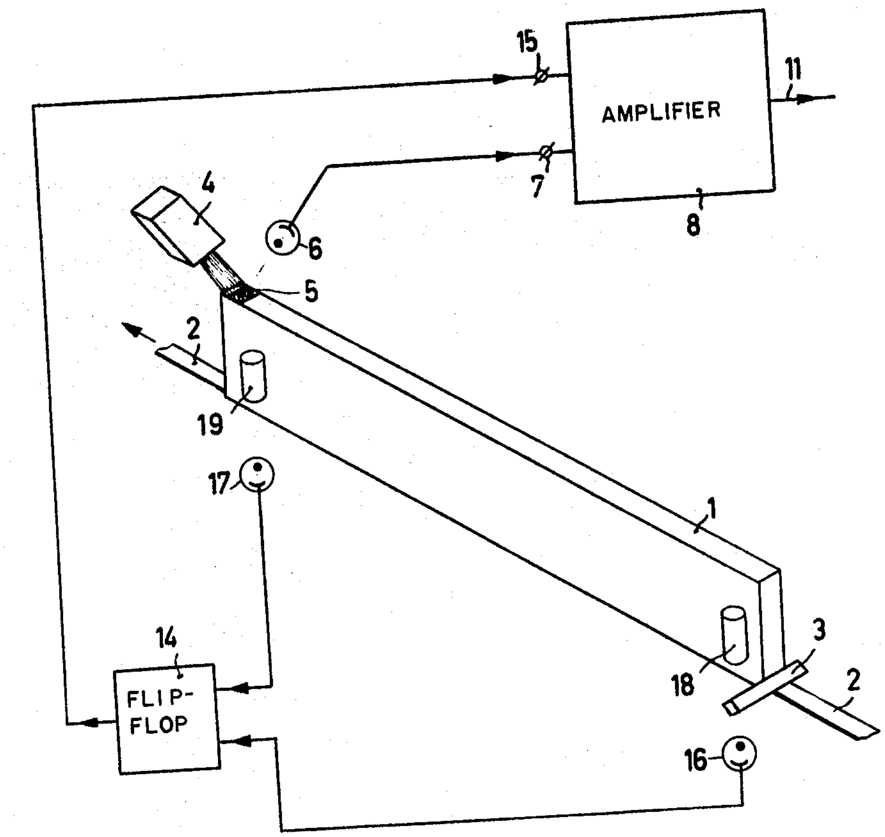

The present invention relates to apparatus for the visual investigation of objects by means of a photocell. The apparatus comprises means for illuminating a portion of the surface of the object to be investigated, at least one photocell which is sensitive to the light reflected from at least a fraction of the said illuminated portion, an amplifier for amplifying the output signal from the photocell, which signal indicates variations in the reflectivity of the object, and means for scanning the light spot from a point outside the surface to be investigated over the said surface and to a point situated on the opposite side of the surface.

Such investigations may, for example, be used in automatic sorting machines for investigating and sorting rods of wood with respect to the presence of knots in any of the side surfaces of the same. In such investigations, the problem arises when the objects are transported through the machine of preventing the strong pulses from the photocell caused by the front and rear edges of the object from being indicated at the output of the amplifier as a variation in the reflectivity of the object. Another problem is that the objects may have mutually different background colours corresponding to different reflection abilities. In this case, for each new object, the amplifier must rapidly be matched to the new background reflectivity and then produce signals indicating abrupt variations in this reflectivity. When investigating rods of wood for knots, the effective scanning action should start as close to the front end of the rod as possible, preferably at a point within a couple of millimeters of said front end. It is therefore necessary that any transient pulses produced when the light beam scans the front edge of the rod should have ended by the time the light beam reaches this point.

An object of the invention is to solve these problems. The invention comprises a differentiating RC-circuit connected between the photocell and the input of the amplifier. Means are provided for short circuiting the resistive branch of the RC-circuit, or at least substantially decreasing the resistance value in the said branch. Control means are provided for the said short circuiting means. The actuation of the control means is determined by the position of the scanning light spot in relation to the edges of the object in the following manner. The resistive branch of the RC-circuit has its normal high value, determined by the resistance in the said branch, from a moment immediately after the scanning light spot has passed the front edge of the object to a moment immediately before the scanning light spot leaves the object. The control means causes the resistive branch of the RC-circuit to be short circuited or to have a low resistance value when the light spot passes the said edges of the object.

The short circuiting means may, according to another feature of the invention, comprise a transistor having its emitter collector path connected in parallel to the resistive branch of the RC-circuit, which transistor at the said moments is switched from a conductive condition to an unconductive condition and vice versa.

During the scanning process the background colour or background reflectivity may undergo a slow change. The time constant of the differentiating circuit with the said short circuiting means in its high resistive condition are therefore to be dimensioned such that the capacitor in the RC-circuit can change its charge in response to slow changes in the reflectivity of the object.

Figure 2:
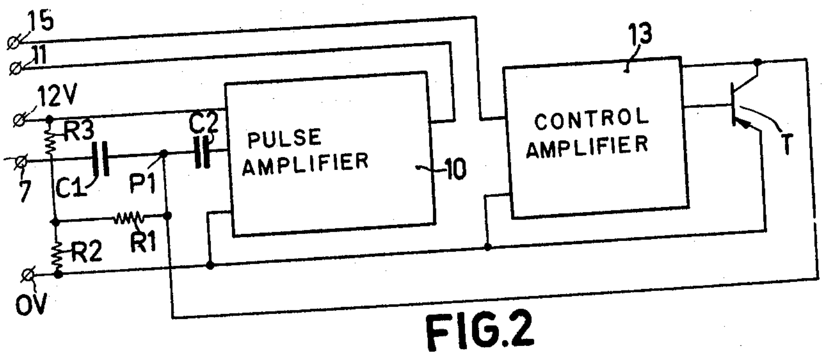

The invention will be explained more fully with reference to the accompanying drawings in which:

FIG. 1 shows schematically a perspective view of an apparatus according to the invention and FIG. 2 shows a circuit diagram, partly in block diagrammatic form, of the apparatus.

In FIG. 1, reference numeral 1 designates a rod of wood which is to be investigated for the presence of knots in its upper side. For this purpose the rod is transported with a certain speed through a scanning and sorting machine by means of a transport tape 2 or the like and a driving pin 3 fixed to the tape. A light source 4 is arranged, by means not shown, to produce a substantially rectangular light spot 5 having a width of several mms. on the upper side of the rod 1. The light reflected from the light spot is detected by means of a photocell 6. The output signal of the photocell is supplied to the input 7 of an amplifier unit 8.

The amplifier unit 8 comprises, as shown in FIG. 2, a pulse amplifier 10 with associated limiting means for suppressing the noise signals so that only pulses exceeding a predetermined level are amplified and passed on. The pulse amplifier 10 may consist of a number of casaded transistor amplifier stages of the type shown in FIG. 89 on page 190 of the textbook "Understanding Digital Computers" by Paul Siegel (1961). Therefore, pulse shaped signals will appear at the output 11 in correspondence to abrupt changes in the reflectivity of the object. The unit 8 further comprises a differentiating RC-circuit arranged at the input of the amplifier and consisting of a capacitor $C_1$ and resistances $R_1$, $R_2$, a transistor T and a control amplifier 13 for the transistor. The said resistances are connected in parallel to the emitter-collector path of the transistor T. The resistance $R_3$, together with the resistance $R_2$, forms a voltage divider keeping the point $P_1$ at a suitable voltage level. At the input of the pulse amplifier 10 there is a further capacitor $C_2$.

The control amplifier 13 receives its input signal, the sync signal, from a bistable flip-flop 14 (FIG. 1) via a sync input 15. A suitable circuit for flip-flop 14 is shown in FIG. 99 on page 204 of the Siegel reference cited above. Control amplifier 13 may consist of a first preamplifier stage as shown in FIG. 89*a* or 89*b* of the Siegel reference followed by an emitter follower stage of the type shown in FIG. 89*c*, except that a p-n-p transistor is used instead of the n-p-n transistor shown. The collector of transistor T may then be connected through a diode to the emitter of the emitter follower stage and the base of transistor T may be connected to a tap on the emitter resistor. The flip-flop is controlled from two photocells 16 and 17. The photocells 16 and 17 form with associated light sources 18 and 19, respectively, two separate units. A signal switching the bistable flip-flop 14 is produced each time the light beam from the light source 18 to the photocell 16 or from the light source 19 to the photocell 17 is interrupted by a projecting portion of the driving pin 3, which projection passes between the light source and photocell.

The described device functions as follows:

When there is no rod in the machine the flip-flop 14 is in such a condition that the voltage produced at the output via the control amplifier 13 maintains the transistor T in a fully conducting state. When a rod is fed into the machine and its front edge reaches the place where it is illuminated from the light source 4, a strong signal is derived from the photocell 6 but this signal is not passed to the amplifier 10 as the transistor T is still in its fully conducting state and thus the point $P_1$ is practically short circuited to earth. Owing to the low resistance in the emitter-collector path of the transistor T, the capacitor $C_1$ is charged rapidly to a voltage value corresponding to the reflectivity of the front end of the rod. In the position shown in the drawing, when the front edge of the rod has passed a small distance beyond the photocell 6, the light beam from the light source 18 to the photocell 16 is interrupted by the said projecting portion of the driving pin 3, whereby the bistable flip-flop 14 is switched to its second stable position. The flip-flop then delivers a voltage to control amplifier 13. Control amplifier 13 causes transistor T to switch over to its non-conducting state. The point $P_1$ will now have an appreciable resistance to earth which is substantially determined by the resistances $R_1$ and $R_2$. Signals originating from the photocell 6 are now passed to the amplifier 10 for indicating, at the output 11, the presence of knots in the rod 1.

When the transistor T is in the non-conductive state, the time constant of the RC-circuit is chosen such that the circuit does not damp the incoming signal too much. The time constant should not be too large for otherwise the capacitor $C_1$ will not have time to change its charge in response to slow changes in the reflectivity of the rod.

If a knot should be situated just at the front end of the rod, the capacitor $C_1$ will be charged to a voltage corresponding to the reflectivity of the knot. This knot will then be indicated when the rear edge of the knot passes the photocell 6, since the amplifier 10 is adapted to transmit pulses of both polarities. The capacitor $C_1$ will then slowly change its charge to a value corresponding to the reflectivity of the wood.

For normal knots situated at the middle of the rod, only a single pulse is received for each knot, as the capacitor $C_1$ has not time to change its charge in the interval between the scanning of the front and rear ends of the knot.

When the whole length of the rod has been scanned, and immediately before the rear edge of the rod has reached the sensitive region for the photocell 6, the light beam between the light source 19 and photocell 17 is interrupted by the driving pin 3 so that the flip-flop 14 returns to its initial position and causes the transistor to switch over to its fully conducting state.

Many modifications of the described embodiment are possible within the scope of the invention. Instead of using a transistor T, any suitable switching means having a controllable resistance value may be used. Several scanning photocells each sensitive to a portion of the light spot may replace the single photocell shown. The invention is not limited to an apparatus hasing a fixed scanning unit relative to which the objects are moveable. The principles of the invnetion may also be applied to an apparatus in which the light spot and/or the photocell perform a sweep movement over the surface, the object being either unmovable or carried through the apparatus simultaneously.

What is claimed is:

1. Apparatus for optically examining an object, comprising means for illuminating a surface of said object with a beam of light, means for moving said light beam and said surface relative to one another so that said light beam effectively moves from a first point outside of said surface across said surface to a second point located beyond said surface, photoelectric means positioned to receive at least a portion of the light from said beam directed thereto by said surface and responsive thereto to produce an electric signal which varies with the intensity of the light received, amplifier means having a signal transmission path comprising a resistance-capacitance differentiating network to which said electric signal is applied and variable impedance means coupled to said resistance-capacitance network so as to control the passage of said electric signal through said transmission path, means for producing a control signal at the passage of said light beam across said first and second points, and means for applying said control signal to said variable impedance means thereby to change the impedance of said resistance-capacitance network so as to block the passage of said electric signal through said amplifier transmission path when said light beam scans beyond said second point.

2. Apparatus as described in claim 1 further comprising a bistable circuit coupled to said variable impedance means so as to change the impedance thereof, said bistable circuit having first and second stable states determined by the relative position of said light beam with respect to said object, said first stable state producing a first control voltage for switching said variable impedance means to a first impedance level thereby to allow the passage of said electric signal through said amplifier means during the period said light beam scans said surface, said second stable state producing a second control voltage for switching said variable impedance means to a second impedance level thereby to block the passage of said electric signal through said amplifier means during the period of said light beam projects beyond the surface of said object.

3. Apparatus for optically examining an object to detect imperfections, comprising means for projecting a light beam onto a surface of said object, means for moving said light beam and said object relative to one another so that said light beam scans the surface of said object and beyond the leading and trailing edges thereof, photoelectric means positioned to intercept at least a portion of the light from said beam directed thereto by said illuminated surface, said photoelectric means producing an electric signal determined by the light received, signal amplifier means having an input circuit coupled to said photoelectric means and an output circuit for producing an output signal proportional to the light received by said photoelectric means, said input circuit comprising a resistance-capacitance differentiating circuit and variable impedance means for controlling the passage of said electric signal to said amplifier means, and control means synchronized with said moving means for producing a control signal at the passage of said light beam past the leading and trailing edges of said object, means for applying said control signal to said variable impedance means thereby to control the impedance thereof so as to permit the passage of said electric signal to said amplifier means during the period said light beams scans said surface and to block the passage of said electric signal to said amplifier means at the points said light beam scans the leading and trailing edges of said object and beyond the edges of said surface.

4. Apparatus for optically examining an object, comprising means for projecting a light beam onto a surface of said object, means for moving said light beam and said object relative to one another so that said light beam scans the surface of said object and beyond the edges thereof, photoelectric means positioned to receive light from said beam reflected by said surface, said photoelectric means producing an electric signal which varies with the reflectivity of said object, signal amplifier means having an input circuit coupled to said photoelectric means and an output circuit for supplying a signal which varies with the light received by said photoelectric means during the period said light beam scans the object, said input circuit comprising a resistance and a capacitance connected to form a differentiating circuit for controlling the passage of said electric signal to said amplifier means, means for suppressing said electric signal during periods said light beam passes the edges of said object comprising impedance means having first and second values of impedance and connected to said resistance-capacitance circuit, and control means synchronized with said moving means for producing and transmitting to said impedance means a control pulse at the passage of said light beam past the edges of said object which causes said impedance means to switch between said first and second impedance values.

5. Apparatus as described in claim 4 wherein said impedance means is connected in parallel with said resistance and wherein said control means transmits a control pulse at the leading edge of said object which switches said impedance means to a first high impedance value and wherein said control means transmits a control pulse at the trailing edge of said object which switches said impedance means to a second low impedance value which effectively blocks the passage of said electric signal to said amplifier means.

6. Apparatus as described in claim 5 wherein said impedance means comprises a transistor having an emitter-collector current path and a control electrode to which said control pulses is applied for varying the conduction in said emitter-collector path, and means for connecting said emitter-collector current path in parallel with said resistance.

7. Apparatus for optically examining an object to detect imperfections, comprising means for producing a beam of light, means for moving said object across the path of said light beam so that said light beam performs a scanning motion over the surface of said object in the direction of travel thereof from a first point outside the surface to be examined to a second point outside of said surface, photoelectric means positioned to receive light from said beam reflected by said surface, said photoelectric means producing an electric signal determined by the light received, signal amplifier means having an input circuit coupled to said photoelectric means and an output circuit for supplying an output signal proportional to the light received by said photoelectric means, said input circuit comprising a resistance-capacitance differentiating circuit for controlling the passage of said electric signal to said amplifier means, variable impedance means having first and second values of impedance, means for coupling said impedance means to said resistance, and control means synchronized with said moving means for producing and transmitting to said variable impedance means a first control pulse at the passage of said light beam past the front edge of said object for causing said impedance means to attain said first impedance value whereby said input circuit passes said electric signal to said amplifier means during the period said light beam scans the object, said control means being adapted to transmit a second control pulse to said variable impedance means at the passage of said light beam past the rear edge of said object for causing said impedance means to attain said second impedance value whereby said input circuit blacks the passage of said electric signal to said amplifier means during the period said light beam projects beyond the edges of said object.

8. Apparatus as described in claim 7 further comprising a first source of light and a first photocell positioned to receive light therefrom and produce a control signal for said control means, said light source and photocell being positioned relative to the travel of said object so that the light received by said photocell from said light source is changed at the point said light beam passes a given edge of said object.

9. Apparatus as described in claim 8 further comprising a second light source and a second photocell positioned to receive light therefrom and produce a control signal for said control means, said second photocell being spaced from said first photocell in the direction of travel of said object, said second light source and said second photocell being positioned relative to the travel of said object so that the light received by said second photocell from said second light source is changed at a point where said light beam scans another edge of said object.

10. Apparatus as described in claim 9 wherein said control means comprises a bistable multivibrator which is switchable between first and second stable states in response to signals received from said first and second photocells, respectively, said bistable multivibrator producing a control signal for switching said variable impedance means between a first high value of resistance when said multivibrator is in its first stable state and a second low value of resistance when said multivibrator is in its second stable state.

11. Apparatus for optically examining an object to detect imperfections, comprising means for producing a beam of light, means for scanning said light beam over a surface of said object from a first point outside of said surface to a second point outside of said surface, a photocell positioned to receive light from said beam reflected by said surface, said photocell producing an electric signal determined by the light received, signal amplifier means having an input circuit coupled to said photocell and an output circuit for supplying a signal during the period said light beam scans the surface of said object which varies with the reflectivity of said surface, said input circuit comprising a resistor and a capacitor connected to form a differentiating circuit, variable impedance means coupled to said resistor for varying the effective resistance of said resistor between a first high resistance value and a second low resistance value, and control means controlled by said scanning means and coupled to said variable impedance means for supplying thereto a control signal at the passage of said light beam past the front and rear edges of said object which controls said variable impedance means between first and second values of impedance such that said resistor has a high effective resistance during the period said light beam scans said surface and has a low effective resistance at the passage of said light beam past the edges of said object.

References Cited by the Examiner

UNITED STATES PATENTS

| | | | |
|---|---|---|---|
| 2,933,185 | 4/1960 | Coleman et al. | 250—209 X |
| 2,994,783 | 8/1961 | Looschen | 250—219 |
| 3,061,731 | 10/1962 | Thier et al. | 250—219 |
| 3,061,732 | 10/1962 | Milnes | 250—219 X |

RALPH G. NILSON, *Primary Examiner.*

WALTER STOLWEIN, *Examiner.*